(12) United States Patent
Flavelle

(10) Patent No.: US 6,857,441 B2
(45) Date of Patent: Feb. 22, 2005

(54) FLUID METERING DEVICE

(75) Inventor: William D. Flavelle, Hoschton, GA (US)

(73) Assignee: Roper Pump Company, Commerce, GA (US)

(*) Notice: Subject to any disclaimer, the term of this patent is extended or adjusted under 35 U.S.C. 154(b) by 132 days.

(21) Appl. No.: 10/144,897

(22) Filed: May 13, 2002

(65) Prior Publication Data

US 2002/0166586 A1 Nov. 14, 2002

Related U.S. Application Data

(60) Provisional application No. 60/290,414, filed on May 11, 2001.

(51) Int. Cl.[7] .............................................. G05D 11/03
(52) U.S. Cl. ...................... 137/9; 137/101; 137/561 A; 418/196
(58) Field of Search ............................. 137/101, 561 A; 418/196

(56) References Cited

U.S. PATENT DOCUMENTS

| | | | |
|---|---|---|---|
| 1,656,093 A | * | 1/1928 | Baker .......................... 418/196 |
| 2,386,219 A | | 10/1945 | Lauck |
| 2,765,749 A | * | 10/1956 | Mosbacher .................. 418/74 |
| 3,854,492 A | | 12/1974 | Kita |
| 4,328,824 A | | 5/1982 | Kiernan et al. |
| 4,531,535 A | | 7/1985 | Kiernan et al. |

FOREIGN PATENT DOCUMENTS

| | | |
|---|---|---|
| CH | 426 499 | 6/1967 |
| DE | 196 47 799 C1 | 4/1998 |
| EP | 0 843 097 A1 | 11/1997 |
| GB | 870019 | 6/1961 |
| SU | 836-387 | 6/1981 |
| WO | WO 92/07179 | 4/1992 |

OTHER PUBLICATIONS

International Search Report from corresponding International Application No. PCT/US02/14999 dated Sep. 23, 2002.

* cited by examiner

*Primary Examiner*—Stephen M. Hepperle
(74) *Attorney, Agent, or Firm*—Alston & Bird LLP

(57) ABSTRACT

A fluid metering device that preferably includes a substantially linear series of intermeshing gears. The fluid metering device includes an inlet port adjacent the intermeshing portion of each pair of gears within the series adjacent the point at which the pair of gears diverge. The device further includes an discharge port adjacent the intermeshing portion of each pair of gears within the series adjacent the point at which the pair of gears converge. The device is configured to convey liquid from a main inlet stream of liquid, through the inlet ports, and out the discharge ports at substantially equal rates. The device preferably includes a pressure balance inlet port and a pressure balance discharge port adjacent the exterior portion of each end gear within the series of gears for balancing forces exerted on the end gear by liquid passing through the various inlet and discharge ports.

49 Claims, 12 Drawing Sheets

FLUID METERING DEVICE

CROSS REFERENCE TO RELATED APPLICATION

This application claims the benefit of U.S. Provisional Application Ser. No. 60/290,414, filed May 11, 2001.

FIELD OF THE INVENTION

This invention relates generally to devices for regulating the flow of liquids, and particularly relates to a flow divider for evenly dividing a stream of liquid, such as liquid fuel, into two or more smaller streams of liquid.

BACKGROUND OF THE INVENTION

When working with liquids, it is often desirable to divide a single stream of liquid into several smaller, equal streams of liquid. This is typically done using a fluid metering device such as liquid flow divider, an equal-flow pump, or an equal-flow liquid motor.

A typical prior art liquid flow divider is taught in U.S. Pat. No. 4,531,535 to Kiernan ("Kiernan"). As shown in FIG. 4 of Kiernan, such liquid flow dividers typically include multiple dividing units of two intermeshed spur gears. The various dividing units are typically linked together by a drive train that may include a drive line, drive shafts, or a sun gear. As a result of this linkage, all of the gears within the various dividing units rotate at substantially the same speed.

Within each individual dividing unit, a liquid inlet port is positioned on one side of the intermeshing portion of the pair of spur gears, and a liquid discharge port is positioned on the other side of the intermeshing portion of the pair of spur gears. A housing is provided that conforms to the exterior portions of the spur gears that are not in communication with the liquid inlet port or the liquid discharge port. All of the various dividing units' liquid inlet ports are in communication with a single, pressurized liquid source.

In operation, pressurized liquid from the pressurized liquid source first enters each dividing unit's liquid inlet port. The pressurized liquid then causes the gears in each dividing unit to rotate in opposite directions so that each gear's gear teeth carry liquid from the liquid inlet port, around the exterior portion of the gear, and into the liquid discharge port. Because all of the dividing gears within the liquid flow divider are preferably the same size and shape, and because the gears are linked together by a central drive train so that all of the gears rotate at the same rate, the flow rate of liquid around each of the flow divider's various gears is identical to the flow rate of liquid around each of the flow divider's other gears. Accordingly, because each dividing unit includes two gears that convey liquid from the dividing unit's liquid inlet port to the dividing unit's liquid discharge port, liquid flows through each dividing unit at a rate that is equal to two times the rate at which the liquid flows around a single gear.

Accordingly, prior art liquid flow dividers are typically designed to include one dividing unit for each equal discharge stream that the flow divider is to produce. For example, if the flow divider is to produce 10 equal discharge streams of liquid, the flow divider will include 10 separate dividing units. As noted above, these dividing units are linked together by a drive train, such as a drive line or a central sun gear.

Such prior art liquid flow dividers have significant disadvantages. First, because it is necessary to include a separate dividing unit for each discharge stream, these liquid flow dividers tend to be mechanically complex. As a result, the flow dividers tend to be expensive to produce and maintain. Also, because the drive trains within these flow dividers are typically less robust than the other components within the flow dividers, the drive trains often break or otherwise malfunction.

More recent prior art flow dividers, such as the liquid flow divider taught in European Patent Application EP 0 843 097 A1, which was filed on behalf of Pumpenfabrik Ernst Scherzinger ("Scherzinger") are similar to the flow dividers described above, except that these flow dividers include a planetary gear arrangement within each dividing unit. These planetary gear arrangements include a large central gear, and two to four planetary gears. Each planetary gear intermeshes with the large central gear, and the various planetary gears are spaced equally apart around the perimeter of the central gear. An inlet port and a discharge port are positioned on opposite sides of the intermeshing portion of the central gear and each planetary gear as described above. Accordingly, each planetary gear cooperates with the central gear to produce a single flow element. Thus, Scherzinger teaches using a planetary gear arrangement to provide multiple two-gear flow elements within a single dividing unit. The central gear acts as one of the gears within each two-gear flow element.

The advantage of the liquid flow divider design taught in Scherzinger is that it reduces the number of parts needed to produce a particular number of discharge streams. However, because only a limited number of planetary gears may be positioned around each central gear, such flow dividers typically include an extended array of dividing units that are linked together, or "stacked", via a drive train as discussed above. Accordingly, like the Kiernan two-gear flow divider, these planetary flow dividers tend to be mechanically complex, which causes the flow dividers to be expensive to produce and maintain. Also, because the drive trains within these flow dividers are typically less robust than the flow divider's other components, the drive trains often break or otherwise malfunction.

A further disadvantage of both the Kiernan and Scherzinger flow dividers is that the design of these flow dividers tends to result in substantial bearing loads being exerted on the bearings that support the flow dividers' various gears. This is due to the fact that liquid flowing through the flow dividers' liquid inlet and discharge ports tends to exert lateral forces on only one side of each gear. This can result in premature failure of the bearings within the flow dividers.

Accordingly, there is a need for improved liquid flow dividers, and other fluid metering devices, that are more robust and that have fewer moving parts than prior art fluid metering devices.

SUMMARY OF THE INVENTION

The present invention provides a fluid metering device, such as a liquid flow divider or pump, that is more robust and has fewer moving parts than prior art fluid metering devices. More particularly, a fuel metering device according to a preferred embodiment of the invention comprises: (1) a first gear; (2) a second gear disposed adjacent the first gear so that the second gear intermeshes with the first gear; (3) a third gear disposed adjacent the second gear so that the second gear is intermediate the first gear and the third gear, and so that the third gear intermeshes with the second gear; (4) a fourth gear disposed adjacent the third gear so that the third gear is intermediate the second gear and the fourth gear, and so that the fourth gear intermeshes with the third gear; (5) a liquid inlet port that is in liquid communication with both a portion of the second gear and a portion of the third gear; (6) a first liquid discharge port that is in liquid communication with both a portion of the first gear and a portion of the second gear; (7) a second liquid discharge port that is in liquid communication with both a portion of the third gear and a portion of the fourth gear. The second gear is configured to move liquid from the liquid inlet port to the first liquid discharge port at a first flow rate, and the third gear is configured to move liquid from the liquid inlet port to the second liquid discharge port at a second flow rate that is preferably equal to the first flow rate.

In a preferred embodiment of the invention, the second gear comprises a first plurality of gear teeth that define a first cavity and the second gear is configured to receive liquid from the liquid inlet port into the first cavity. The second gear is also preferably configured to move liquid from the liquid inlet port to the first liquid discharge port by rotating between: (1) a first position in which the first cavity is in liquid communication with the liquid inlet port; and (2) a second position in which the first cavity is in liquid communication with the first liquid discharge port.

Similarly, the third gear comprises a second plurality of gear teeth that define a second cavity. The third gear is also configured to receive liquid from the liquid inlet port into the second cavity and to move the liquid from the liquid inlet port to the second liquid discharge port by rotating between: (1) a first position in which the second cavity is in liquid communication with the liquid inlet port; and (2) a second position in which the second cavity is in liquid communication with the second liquid discharge port.

In a preferred embodiment of the invention, the fluid metering device includes a mechanism through which it can be driven by an external motive force to rotate the first, second, third, and fourth gears about their respective axes of rotation. In another embodiment of the invention, the liquid inlet port and the second and third gears are preferably configured so that: (1) liquid from the liquid inlet port exerts a first rotational force on the second gear; and (2) liquid from the liquid inlet port exerts a second rotational force on the third gear.

In a further preferred embodiment of the invention, the fluid metering device preferably comprises a pressure balance port disposed adjacent the first gear that is in liquid communication with a portion of the first gear. In this embodiment of the invention, the fluid metering device is configured so that: (1) liquid passing through the first liquid discharge port exerts a first force on the first gear in a first direction; (2) liquid within the pressure balance port exerts a second force on the first gear in a second direction so that the second force substantially offsets at least a portion of the first force; and (3) the liquid within the pressure balance port is substantially stagnant.

The first, second, third, and fourth gears are preferably positioned so that the axis of rotation of each of the first, second, third, and fourth gears lies substantially within a single plane. In addition, the liquid inlet port, the first liquid discharge port, and the second liquid discharge port are preferably each adjacent a first side of the single plane. In a preferred embodiment of the invention, the liquid inlet port, the first liquid discharge port, and the second liquid discharge port lie substantially along a straight line that is substantially parallel to the single plane.

In a preferred embodiment of the invention, at least four of the fluid metering device's gears are arranged in a zig-zag configuration. In this configuration, the first, second, third, and fourth gears are preferably positioned so that an axis of rotation of the first gear and an axis of rotation of the third gear lie substantially within a first plane, and so that and axis of rotation of the second gear and an axis of rotation of the fourth gear lie substantially within a second plane. This second plane is preferably substantially parallel to, and offset from, the first plane. Furthermore, in such a zig-zag configuration, an axis of rotation of the first gear and an axis of rotation of the second gear lie within a third plane, an axis of rotation of the second gear and an axis of rotation of the third gear lie within a fourth plane, and the third plane and the fourth plane intersect to form an angle of less than about 178 degrees.

In a preferred embodiment of the invention, the fluid metering device further includes a second liquid inlet port that is in liquid communication with both a portion of the first gear and a portion of the second gear. In this embodiment of the invention, the first gear is configured to move liquid from the second liquid inlet port to the first liquid discharge port at a third flow rate, and the first, second, and third flow rates are preferably substantially equal.

In a preferred embodiment of the invention, the first liquid discharge port and the second liquid inlet port are preferably positioned on opposite sides of an intermeshing portion of the first and second gears. In this embodiment of the invention, the first and second liquid inlet ports are configured so that liquid passing through the first liquid inlet port exerts a first force on the second gear in a first direction, and so that liquid passing through the second liquid inlet port exerts a second force on the second gear in a second direction, the second direction being substantially opposite to the first direction. This serves to reduce bearing loads associated with the second gear.

In a further preferred embodiment of the invention, the fluid metering device further includes a third liquid discharge port that is in liquid communication with both a portion of the second gear and a portion of the third gear. In this embodiment of the invention, the second gear is preferably configured to move liquid from the second liquid inlet port to the third liquid discharge port at a fourth flow rate. The first and third liquid discharge ports are preferably configured so that liquid passing through the first liquid discharge port exerts a first force on the second gear in a first direction, and so that liquid passing through the third liquid discharge port exerts a second force on the second gear in a second direction that is substantially opposite to the first direction. These first and second forces are preferably of substantially the same magnitude.

Yet another preferred embodiment of the invention includes a third liquid inlet port that is in liquid communication with both a portion of the third gear and a portion of the fourth gear. In this embodiment of the invention, the third gear is configured to move liquid from the third liquid inlet port to the third liquid discharge port at a fifth flow rate. In addition, the fourth gear is configured to move liquid from the third liquid inlet port to the second liquid discharge port at a sixth flow rate. In a preferred embodiment of the invention, the first, second, third, fourth, fifth, and sixth flow rates are substantially equal.

In a further preferred embodiment of the invention, the fluid metering device further includes a fifth gear disposed adjacent the fourth gear so that the fourth gear is intermediate the third gear and the fifth gear, and so that the fifth gear intermeshes with the fourth gear. This embodiment of the invention further includes an additional liquid inlet port that is in liquid communication with both a portion of the fourth gear and the fifth gear. The fourth gear is preferably configured to move liquid from the additional liquid inlet port to the second liquid discharge port.

A fluid metering device according to a further preferred embodiment of the invention comprises: (1) an inboard gear; (2) an end gear adjacent the inboard gear; (3) an interior liquid port disposed adjacent both the inboard gear and the end gear, the interior liquid port being in liquid communication with both a portion of the inboard gear and a portion of the end gear; and (4) a pressure balance port disposed adjacent the end gear that is in liquid communication with a portion of the end gear. This fluid metering device is preferably configured so that liquid passing through the interior liquid port exerts a first force on the end gear in a first direction. Furthermore, the fluid metering device is preferably configured so that liquid within the pressure balance port exerts a second force on the end gear in a second direction so that the second force substantially offsets at least a portion of the first force.

In this embodiment, the interior liquid port and the pressure balance port are preferably positioned on opposite sides of the end gear. Furthermore, the pressure balance port is preferably positioned so that the pressure balance port is not in liquid communication with the inboard gear. In addition, the pressure balance port is preferably configured so that liquid within the pressure balance port is stagnant.

In a preferred embodiment of the invention, the interior liquid port and the pressure balance port are positioned so that a portion of the interior liquid port, a portion of the pressure balance port, and an axis of rotation of the end gear lie within a common plane. This embodiment of the invention preferably comprises a second end gear and is configured so that the rotational axes of the first end gear, the inboard gear, and the second end gear each lie substantially within a common plane.

A fluid metering device according to a further embodiment of the invention comprises: (1) an inboard gear having gear teeth; (2) an end gear having gear teeth, the end gear being disposed adjacent the inboard gear so that the gear teeth of the end gear intermesh with the gear teeth of the inboard gear; (3) an interior liquid inlet port that is positioned adjacent both the inboard gear and the end gear, and that is in liquid communication with both (a) at least one cavity defined by the end gear's gear teeth and (b) at least one cavity defined by the inboard gear's gear teeth; (4) an interior liquid discharge port disposed adjacent both the inboard gear and the end gear, the interior liquid discharge port being in liquid communication with both (a) at least one cavity defined by the end gear's gear teeth, and (b) at least one cavity defined by the inboard gear's gear teeth; (5) a first pressure balance port that is positioned adjacent the end gear and that is in liquid communication with at least one cavity defined by the end gear's gear teeth; and (6) a second pressure balance port disposed adjacent the end gear, the second pressure balance port being in liquid communication with at least one cavity defined by the end gear's gear teeth.

In this embodiment of the invention, the first pressure balance port is configured so that liquid within the first pressure balance port exerts forces on the end gear that substantially offset forces exerted on the end gear by liquid passing through the interior liquid inlet port. Furthermore, the second pressure balance port disposed adjacent the end gear, the second pressure balance port being in liquid communication with at least one cavity defined by the end gear's gear teeth, and the second pressure balance port is configured so that liquid within the second pressure balance port exerts forces on the end gear that substantially offset forces exerted on the end gear by liquid passing through the interior liquid discharge port.

Furthermore, in this embodiment of the invention, the interior liquid inlet port and the first pressure balance port are disposed on opposite sides of the end gear, and the interior liquid discharge port and the second pressure balance port are disposed on opposite sides of the end gear. In addition, the end gear is preferably configured to rotate between: (1) a first configuration in which a cavity defined by the end gear's gear teeth is adjacent to, and in liquid communication with, the interior liquid inlet port; and (2) a second configuration in which the cavity is adjacent to, and in liquid communication with, the interior liquid discharge port. Also, in a preferred embodiment of the invention, the first and second pressure balance ports are positioned so that they are not in liquid communication with a cavity defined by the inboard gear's gear teeth.

BRIEF DESCRIPTION OF THE DRAWINGS

Figure 1A:
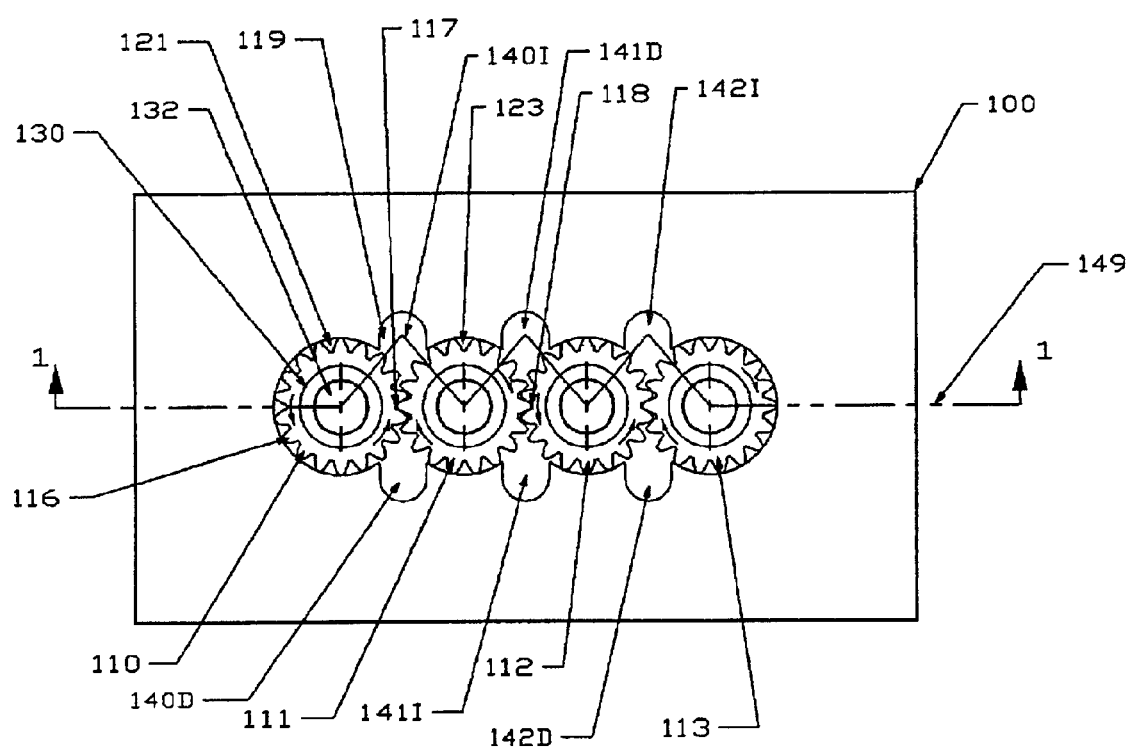
Figure 1B:
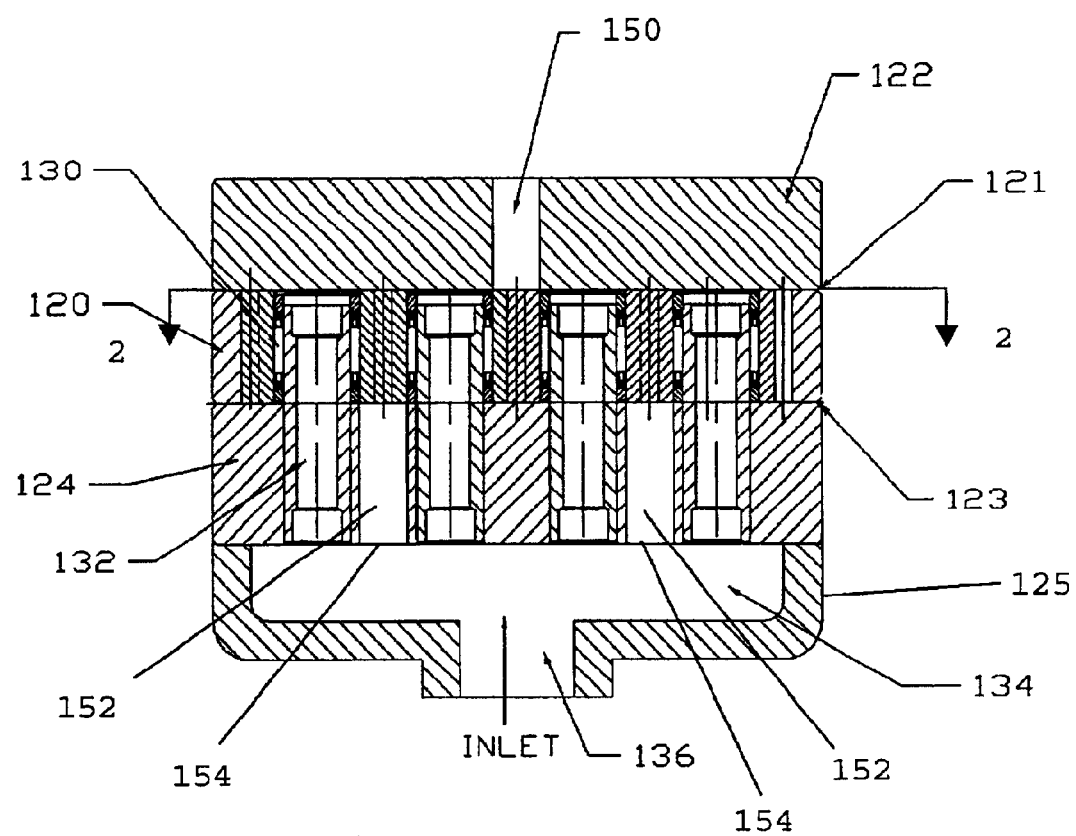

Having thus described the invention in general terms, reference will now be made to the accompanying drawings, which are not necessarily drawn to scale, and wherein:

FIG. 1A is a sectional view of the interior of a flow divider according to a first embodiment of the present invention taken substantially along Line 2—2 of FIG. 1B in the direction indicated by the arrows of Line 2—2.

FIG. 1B is a sectional view of the interior of the flow divider of FIG. 1A taken substantially along Line 1—1 of FIG. 1A in the direction indicated by the arrows of Line 1—1.

Figure 1C:
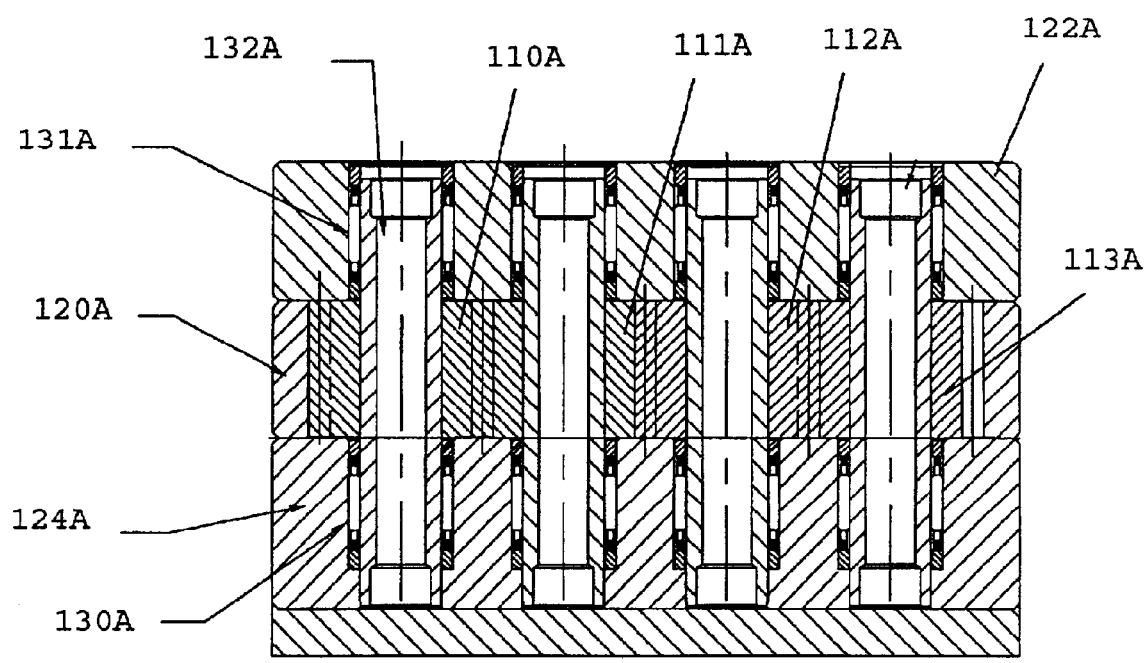

FIG. 1C is a sectional view of the interior of an alternative embodiment of the flow divider of FIG. 1A taken substantially along a straight line that passes through the centers of the axes of rotation of the gears 110–113 shown in FIG. 1A.

Figure 2:
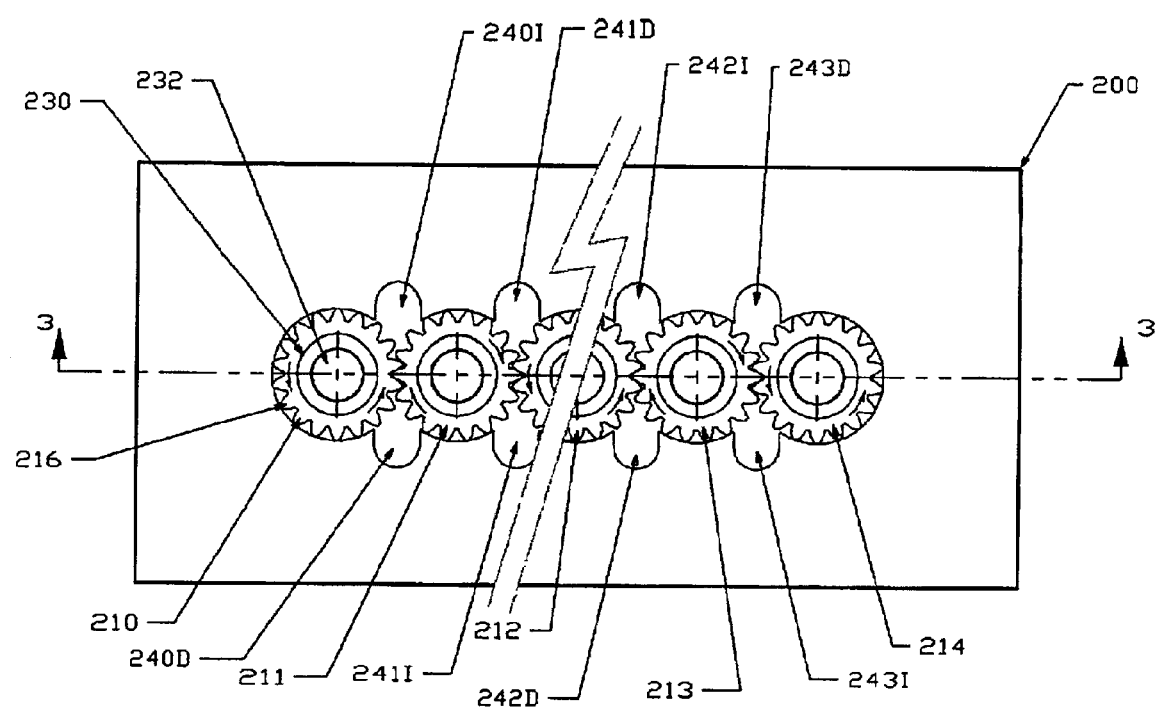

FIG. 2 is a sectional view of the interior of a flow divider according to a second embodiment of the present invention. This figure demonstrates that various embodiments of the invention may include a linear series of gears that includes any number of intermeshed gears.

Figure 3A:
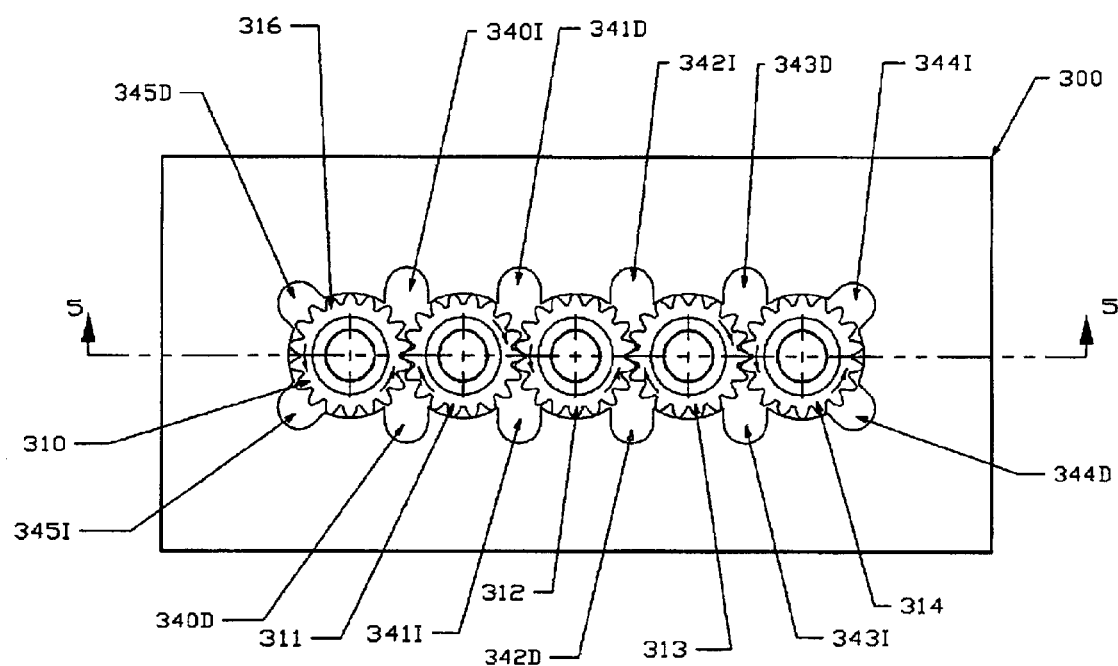
Figure 3B:
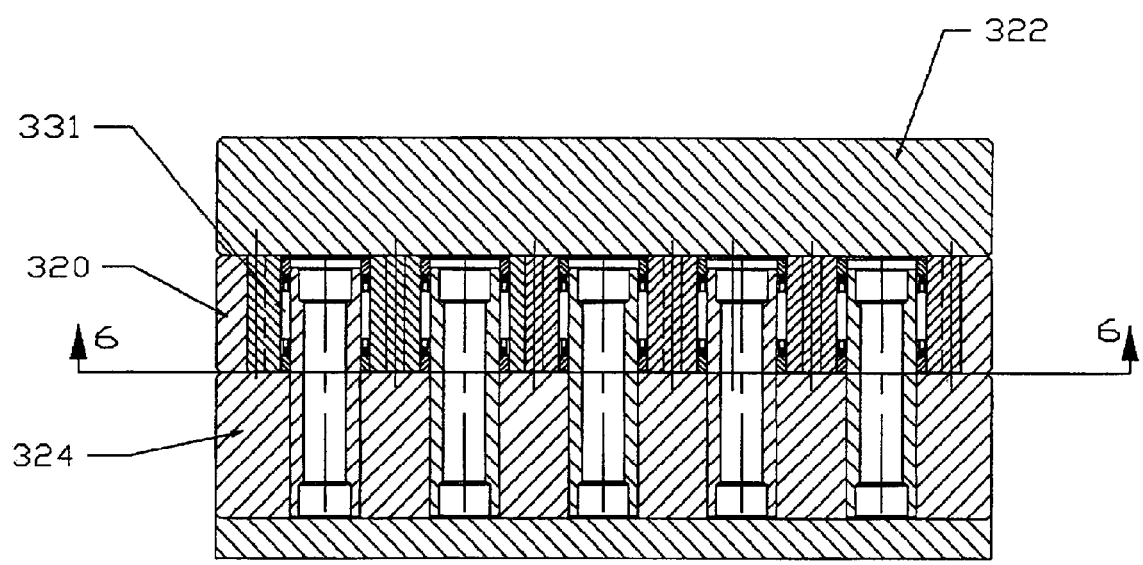

FIG. 3A is a sectional view of the interior of a flow divider according to a third, and preferred, embodiment of the present invention taken substantially along Line 6—6 of FIG. 3B in the direction indicated by the arrows of Line 6—6.

FIG. 3B is a sectional view of the interior of the flow divider of FIG. 3A taken substantially along Line 5—5 of FIG. 3A in the direction indicated by the arrows of Line 5—5.

Figure 3C:
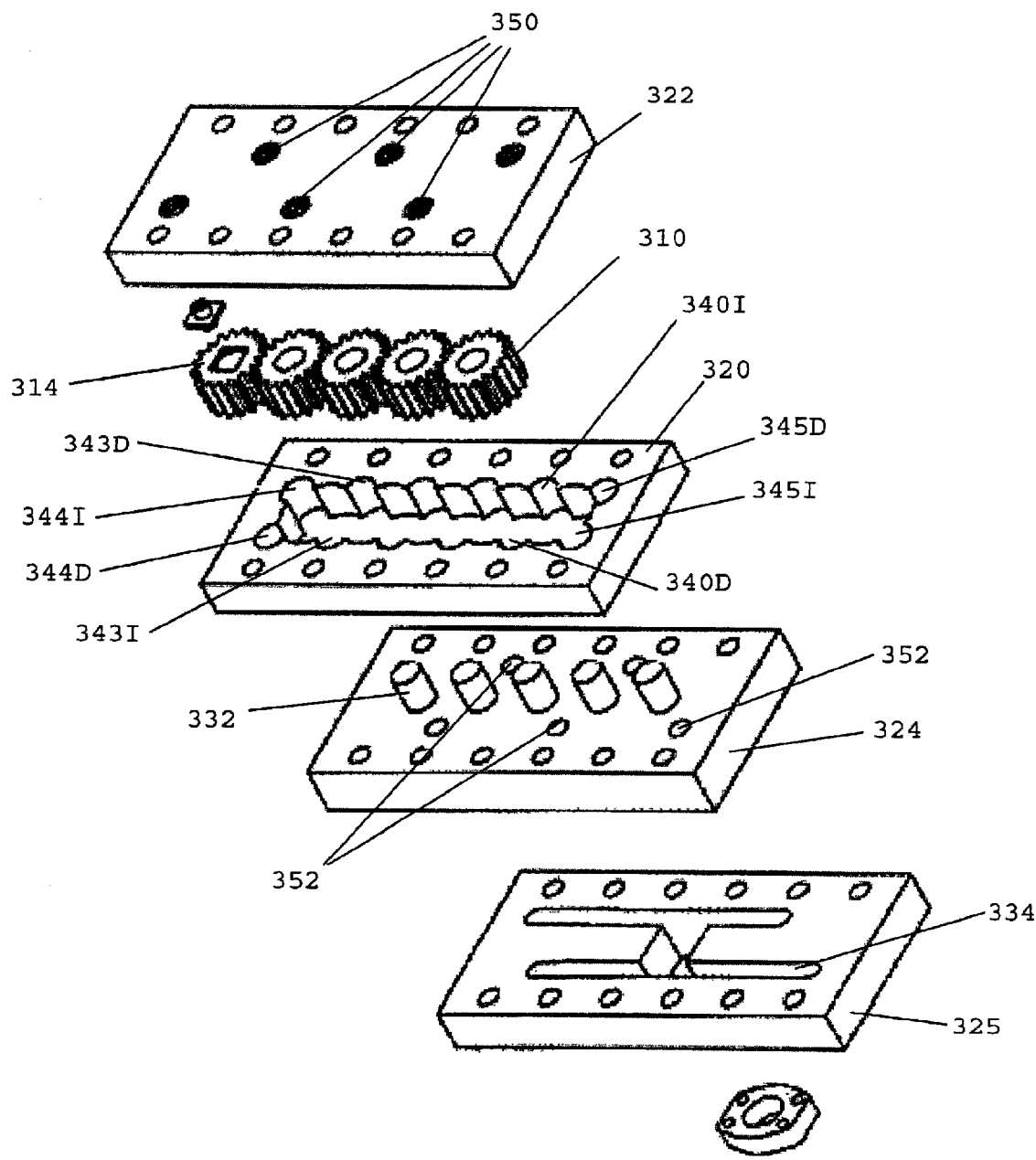

FIG. 3C is an exploded view of the flow divider of FIG. 3A.

Figure 4A:
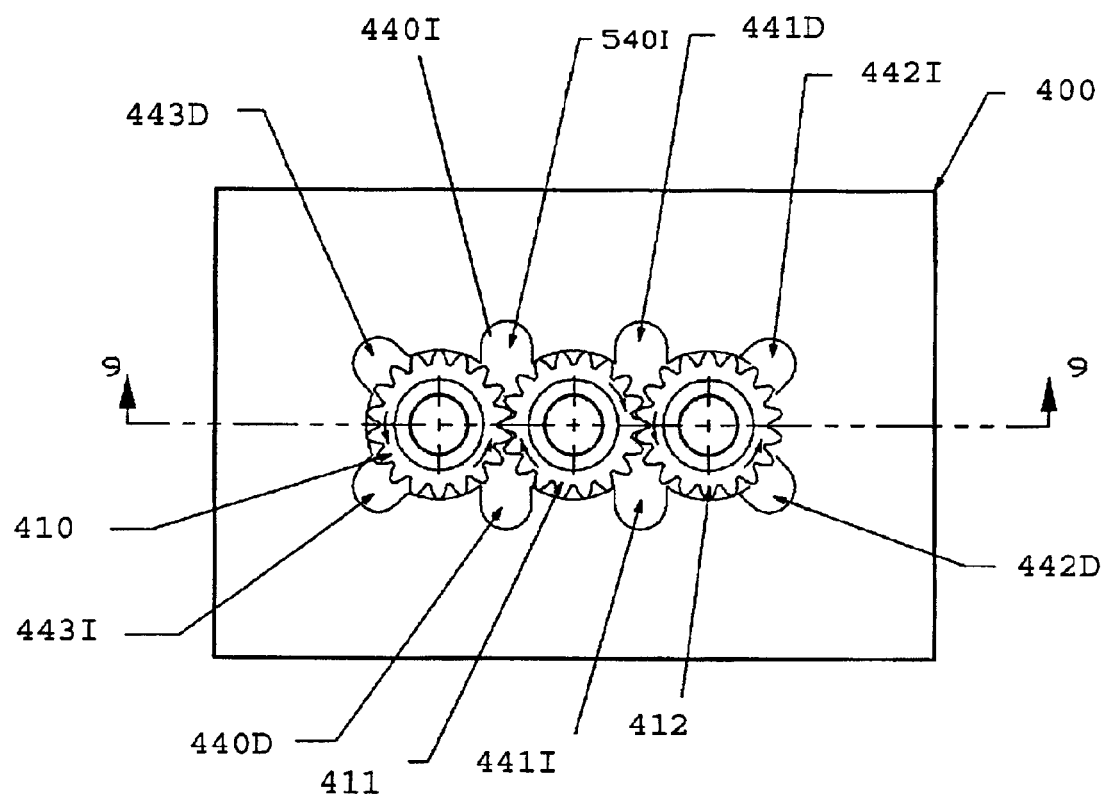
Figure 4B:
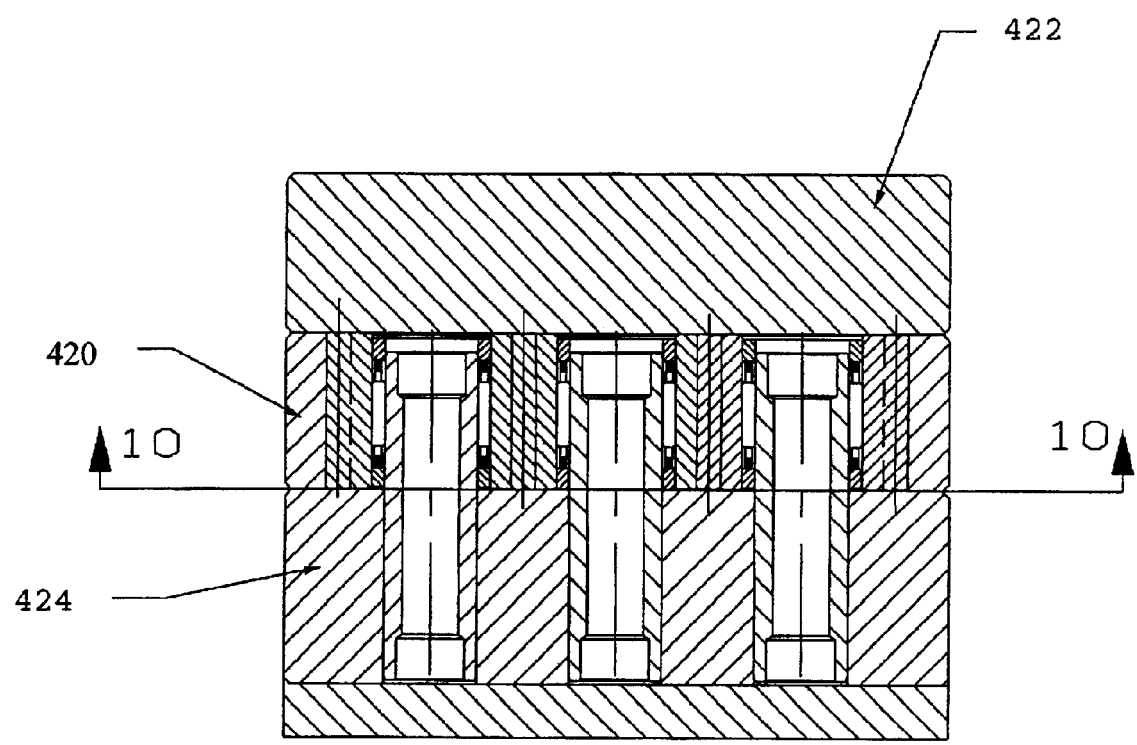

FIG. 4A is a sectional view of the interior of a flow divider according to a fourth embodiment of the present invention taken substantially along Line 10—10 of FIG. 4B in the direction indicated by the arrows of Line 10—10.

FIG. 4B is a sectional view of the interior of the flow divider of FIG. 4A taken substantially along Line 9—9 of FIG. 4A in the direction indicated by the arrows of Line 9—9.

Figure 5:
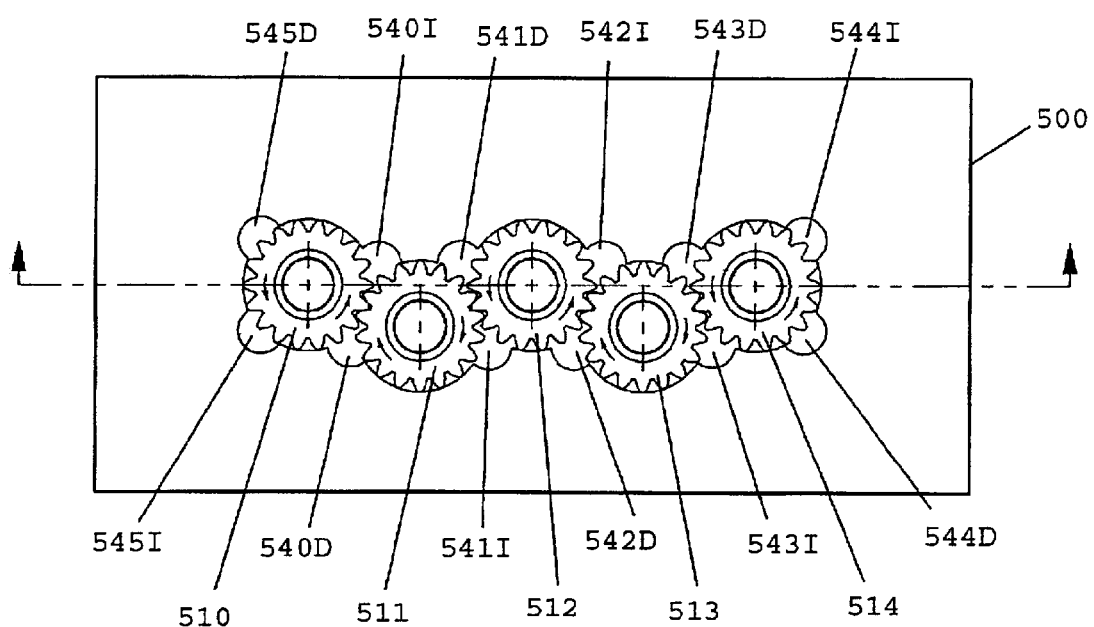

FIG. 5 is a sectional view of the interior of a flow divider according to an alternative embodiment of the invention in which the gears are in a "zig-zag" configuration.

Figure 6:
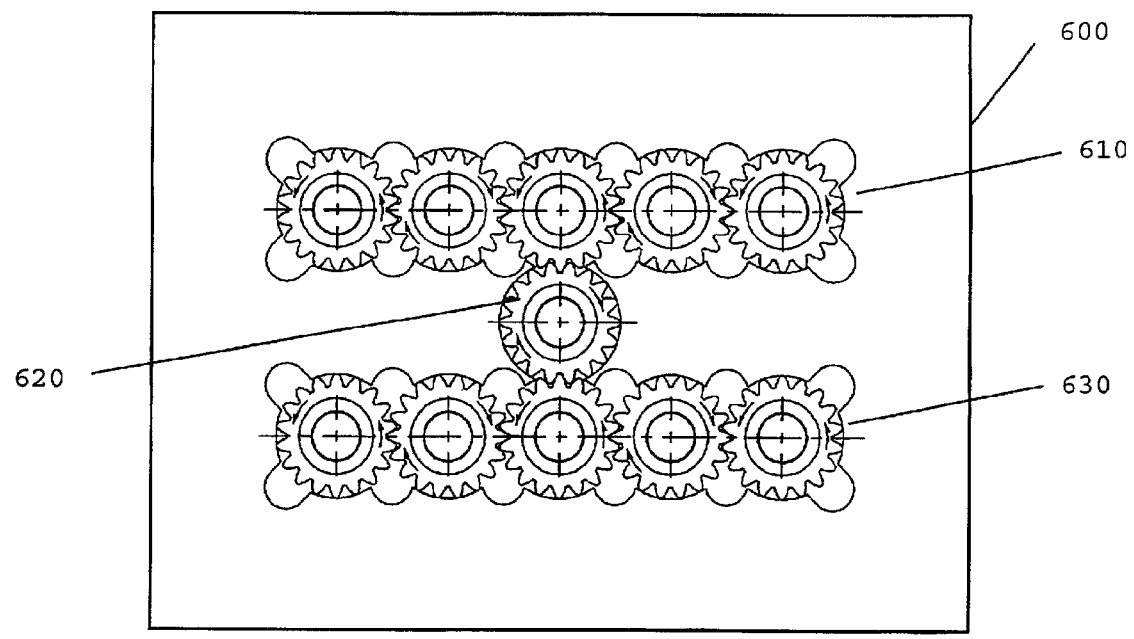

FIG. 6 is a sectional view of the interior of a flow divider according to an alternative embodiment of the invention in which the gears are in an "H" configuration.

Figure 7:
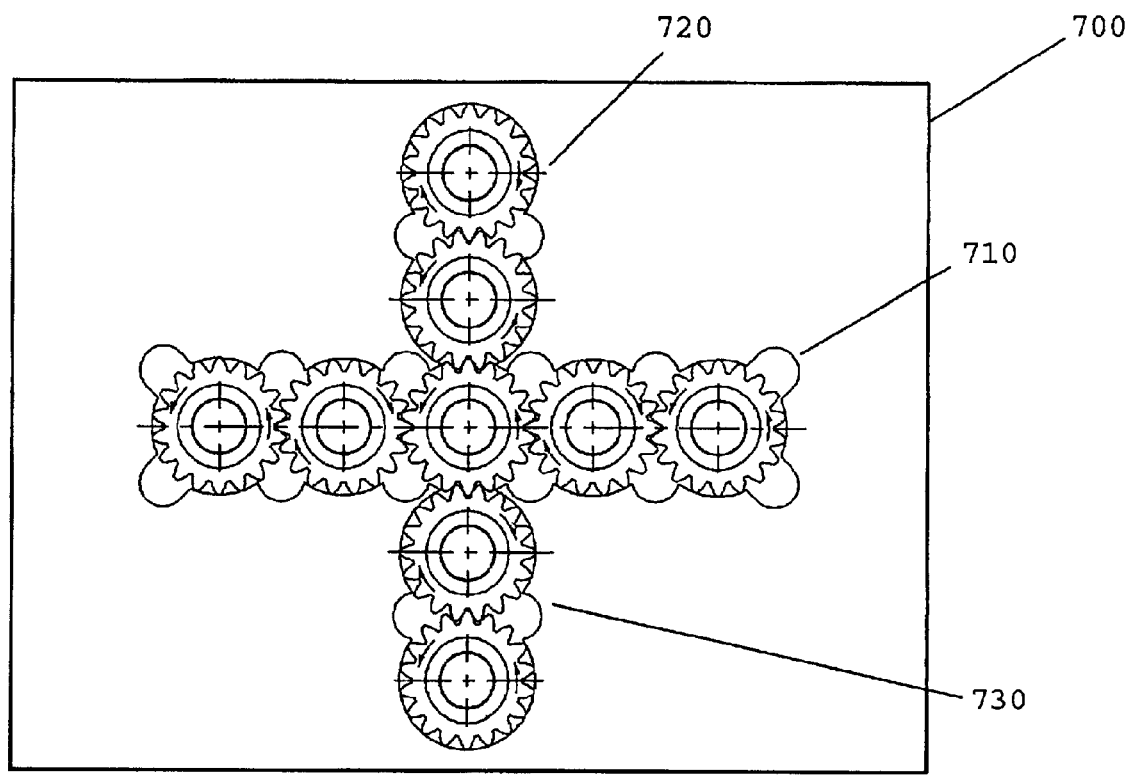

FIG. 7 is a sectional view of the interior of a flow divider according to an alternative embodiment of the invention in which the gears are in a "cross" configuration.

DETAILED DESCRIPTION OF THE INVENTION

The present invention will now be described with reference to the accompanying drawings, in which preferred embodiments of the invention are shown. This invention may, however, be embodied in many different forms and should not be construed as limited to the embodiments set forth below. Rather, these embodiments are provided so that this disclosure will be thorough and complete, and will fully convey the scope of the invention to those skilled in the art. Like numbers refer to like elements throughout.

Definitions

For the purposes of this disclosure, the following terms have the meanings set forth below:

A "series of gears" is a plurality of gears that are positioned so that the gear teeth of each gear within the series of gears intermeshes with the gear teeth of at least one other gear in the series.

An "intermeshing portion" of a pair of neighboring gears is the location at which the teeth of the first gear in the pair comes into contact with the teeth of the second gear in the pair.

A "flow element" is a pair of gears that convey liquid from one or more inlet ports to a discharge port.

An "end gear" is a gear that is located at one end of a series of gears.

A "inboard gear" is a gear that is positioned within a series of gears and that is not located at one end of the series of gears.

A "liquid port" is either an inlet port or a discharge port.

A "pressure balance port" is either a pressure balance inlet port or a pressure balance outlet port.

Two gears are referred to as "intermeshing" when the teeth of the two gears intermesh.

Description of a Preferred Embodiment of the Invention

A fluid metering device 100 according to a preferred embodiment of the invention is shown in FIGS. 1A and 1B. As may be understood from these figures, the flow divider 100 includes a substantially linear series of intermeshing, flow-metering spur gears 110–113 (or other suitable type of gear), each of which is configured to rotate about an axis of rotation. The spur gears 110–113 are positioned so that they are substantially coplanar, and so that each spur gear is parallel to and spaced from at least one neighboring spur gear. Furthermore, the spur gears 110–113 are positioned so that the axis of rotation of each of the gears 110–113 is positioned along a common central line 149. As may be understood from FIGS. 1A and 1B, the spur gears 110–113 are also positioned so that the teeth 116 of each spur gear 110–113 intermesh with the teeth 116 of at least one neighboring spur gear 110–113.

For example, as shown in FIG. 1A, the leftmost gear 110 in the linear series of gears 110–113 is offset from the second leftmost gear 111 so that the teeth 116 of these two gears 110, 111 intermesh. Similarly, the third leftmost gear 112 is spaced apart from the second leftmost gear 111 so that the teeth 116 of these two gears also intermesh.

As is taught in UK Patent 870,019, which is incorporated herein by reference, the various gears 110–113 are contained within a hollow central housing 120 that has an open first end 121 and an open second end 123. A first side plate 122 is positioned to cover the open first end 121 of the central housing 120, and a second side plate 124 is positioned to cover the open second end 123 of the central housing 120. In a preferred embodiment of the invention, the second side plate 124 preferably includes a plurality of inlet passageways 152 that extend through the second side plate 124. Each of these inlet passageways 152 preferably provides a conduit between a liquid source, such as a main inlet port 136, and the inlet side of one intermeshing pair of gears.

Similarly, the first side plate 122 includes a plurality of discharge passageways 150 that extend through the first side plate 122. Each of these discharge passageways 150 preferably provides a conduit between the discharge side of one intermeshing pair of gears and an exterior portion of the flow divider.

In a preferred embodiment of the invention, an inlet channel plate 125 is positioned adjacent the second side plate 124 so that the second side plate 124 is between the inlet channel plate 125 and the central housing 120. The inlet channel plate 125 preferably includes an inlet channel 134 that is configured to align with the inlet side of each of the second side plate's various inlet passageways 152. This allows liquid from the liquid inlet channel 134 to communicate with the inlet side of each of the liquid flow divider's intermeshing pairs of gears via the second side plate's inlet passageways 152.

Each gear 110–113 is mounted within the inboard housing 120 so that it is free to rotate about an axis of rotation. In a preferred embodiment of the invention, each gear 110–113 is supported by a bearing 130, such as a roller bearing or a needle bearing. Each of these bearings 130 is mounted on a shaft 132 that is secured, at one end, to the second side plate 124. Alternatively, as shown in FIG. 1C, each gear 110A–113A is pressed or keyed onto a shaft 132A, and the shaft 132A is mounted both on a first bearing 130A that is attached to the second side plate 124A, and a second bearing 131A that is attached to the first side plate 122A.

As may be generally understood from FIGS. 1A and 1B and the discussion above, each of the gears 110–113 is in fluid communication with a liquid inlet channel 134 that directs a pressurized stream of liquid through the various inlet passageways 152 to the inlet side of the intermeshing portion of each intermeshing pair of gears. (For example, as shown in FIG. 1A, the liquid passageway 134 directs a stream of liquid to the inlet side 119 of the intermeshing portion 117 defined by the leftmost gear 110 and the second leftmost gear 111.) As a result, the pressurized stream drives the various gears 110–113 in tandem so that each gear rotates in a direction that is opposite to the direction in which its immediately neighboring gears are rotating. For example, as shown in FIG. 1A, while the leftmost gear 110 rotates in a counterclockwise direction, its only immediately neighboring gear (the second to the leftmost gear 111) rotates in a clockwise direction.

As a result of the rotation of the gears 110–113 described above, after a stream of liquid is directed to the inlet side (for example, inlet side 119) of the intermeshing portion of an intermeshing pair of gears, the stream is divided in half by the two gears. Generally speaking, this occurs because, as the gears rotate, liquid flows into the spaces between the teeth 116 of the first gear (for example, gear 110) in the intermeshing pair of gears, and is carried, in a counterclockwise direction, until the peaks of the gear teeth that contain the liquid are immediately adjacent a portion of the flow divider's housing. This acts to trap the liquid between the gear teeth and the housing.

The first gear then continues to rotate in a counterclockwise direction until the peaks of the gear teeth that contain the liquid are positioned adjacent a first discharge port (for example, discharge port 140D). At this point, the liquid is no longer held in place between the gear teeth because the peaks of the gear teeth are no longer immediately adjacent a portion of the flow divider's housing. The first gear then continues to rotate in a counterclockwise direction until the gear teeth that contain the liquid come into mesh with the gear teeth of the second gear (for example, gear 111) in the intermeshing pair of gears. As the gear teeth of the first gear in the intermeshing pair of gears (e.g., gear 110) come into mesh with the gear teeth of the second gear in the intermeshing pair of gears (e.g., gear 111), the second gear's gear teeth displace the liquid from the spaces between the first gear's gear teeth. This forces the liquid into and through the discharge port (e.g., first discharge port 140D) that is adjacent the intermeshing pair of gears.

Similarly, an equal amount of liquid flows into the spaces between the teeth of the second gear (for example, gear 111) in the intermeshing pair of gears, and is carried, in a clockwise direction, around the outer perimeter of the second gear until the liquid is positioned adjacent a second discharge port (for example discharge port 141D). This liquid is then displaced from the spaces between the second gear's gear teeth as these gear teeth come into mesh with the gear teeth of another gear (for example, gear 112) that is positioned adjacent the second discharge port. This forces the liquid into and through the second discharge port (e.g., second discharge port 141D).

In a preferred embodiment of the invention, the streams of liquid passing around the two gears in each pair of intermeshing gears are essentially identical. This is due to the following aspects of the liquid flow divider: (1) the various gears 110–113 have substantially the same dimensions (e.g., the radii of the gears 110–113, the pitches of the gears' gear teeth 116 and the widths of the gears are essentially the same); (2) the distance between the housing immediately adjacent each of the gears 110–113, and the gear teeth of the various gears 110–113 (lateral and radial clearance) is minimal; and (3) the gears 110–113 are driven at substantially the same rate. Because each discharge port 140D–142D is fed by two gears (for example, discharge port 140D is fed by gears 110 and 111), and because the various gears 110–113 feed the liquid at essentially identical rates, essentially identical amounts of liquid flow out of each discharge port 140D–142D.

Thus, when the flow divider 100 is in operation, an external pump directs liquid into the flow divider 100 via a main inlet port 136. The liquid then passes through the main inlet port 136, and into a liquid inlet channel 134 that is in liquid communication with each of the flow divider's inlet ports 140I–142I. After the liquid is pumped into the liquid inlet channel 134, the liquid moves (under pressure supplied by the external pump) through the inlet passageways 152 and into the various inlet ports 140I–142I. The pressurized liquid then exerts rotational forces on gears 110–113, which causes the gears 110–113 to rotate in the directions indicated by the arrows shown in FIG. 1A.

As described above, as the gears 110–113 rotate, liquid is trapped between the teeth 116 of each of the various gears 110–113 and carried around the gears 110–113. The liquid is then discharged into the interior of the various discharge ports 140D–142D as the various gears come into mesh adjacent the discharge ports 140D–142D. Finally, the liquid is forced through of the various discharge ports 140D–142D and out the various discharge passageways 150.

As noted above, because the gears 110–113 are preferably substantially identical in size and shape, and because the lateral and radial clearances between the gears and their enclosure are minimal, the flow rates of the liquid exiting the various discharge ports 140D–142D are preferably substantially identical, even under varying discharge line backpressure conditions. Thus, for example, the flow rate of liquid exiting discharge port 140D is substantially the same as flow rate of the liquid exiting discharge ports 141D, and 142D.

As shown in FIGS. 1A and 1B, in one embodiment of the invention, each inboard gear 111, 112 is positioned adjacent two inlet ports 140I–142I so that these two inlet ports are on opposite sides of the inboard gear 111, 112 and lie within a common plane that passes through the axis of rotation of the inboard gear 111, 112. Thus, because the liquid pressure within each of the inlet ports 140I–142I is normally similar to (and preferably substantially equal to) the liquid pressure within each of the other inlet ports 140I–142I, the liquid passing through these inlet ports 140I–142I exerts similar (and preferably substantially equal) and opposite forces on the inboard gear 111, 112. As a result, the net force that liquid passing through the inlet ports 140I–142I exerts on each of the inboard gears 111, 112 (and the inboard gears' bearings and shafts) is relatively small, and preferably substantially equal to zero.

For example, referring to FIGS. 1A and 1B, in a preferred embodiment of the invention, the liquid pressure within the leftmost inlet port 140I is similar to (and preferably substantially equal to) the liquid pressure within the second leftmost inlet port 141I. As a result, liquid passing through these inlet ports 140I, 141I exerts substantially similar (and preferably substantially equal) and diametrically-opposed lateral forces on the leftmost inboard gear 111. Thus, the net force that liquid passing through the inlet ports 140I, 141I exerts on the leftmost inboard gear 111 is relatively small, and preferably substantially equal to zero.

As may also be understood from FIG. 1A, in a preferred embodiment of the invention, each inboard gear 111, 112 is also positioned adjacent two discharge ports 140D–142D so that these two discharge ports 140D–142D are positioned on opposite sides of the inboard gear 111, 112 along a common plane that passes through the axis of rotation of the inboard gear 111, 112. Because of this, and because the liquid pressure within each discharge port 140D–142D is normally similar to (and preferably substantially equal to) the liquid pressure within each of the other discharge ports 140D–142D, the liquid passing through these discharge ports 140D–142D exerts similar (and preferably substantially equal) and opposite forces on the inboard gear 111, 112. As a result, the net force that liquid passing through the discharge ports 140D–142D exerts on each of the inboard gears 111, 112 (and the inboard gears' corresponding bearings and shafts) is also relatively small, and preferably substantially equal to zero.

For example, referring to FIGS. 1A and 1B, the liquid pressure within discharge port 140D is normally similar to (and preferably substantially equal to) the liquid pressure within discharge port 141D. As a result, liquid passing through these discharge ports 140D, 141D exerts similar (and preferably substantially equal) and diametrically opposed forces on the central gear 111 that is adjacent these discharge ports 140D, 141D. Thus, the sum of the forces exerted on the this central gear 111 by liquid passing through these discharge ports 140D, 141D is also relatively small, and often substantially equal to zero.

As may be understood from FIG. 1A, the end gears 110, 113 within the linear series of gears 110–113 are each adjacent to only one inlet port 140I, 142I and one discharge port 140D, 142D, and each of these inlet and discharge ports 140I, 142I, 140D, 142D is adjacent the interior side of one of the end gears 110, 113. As a result, the liquid passing through the inlet and discharge ports, 140I, 142I, 140D, 142D exerts a net lateral load on the interior side of each end gear 110, 113. This can reduce the life of the end gears 110, 113 and the bearings and shafts associated with these end gears 110, 113.

In a preferred embodiment of the invention shown in FIGS. 3A and 3B, which depicts a five-gear embodiment of the invention, a pressure balance inlet port 344I, 345I is provided adjacent each end gear 310, 314 and is supplied with liquid at the same pressure as the liquid passing through the various interior inlet ports 340I–343I. In a preferred embodiment of the invention, these pressure balance inlet ports 344I, 345I are in liquid communication with the liquid inlet channel 134, but no passageway is provided to allow the liquid to flow significantly past the pressure balance inlet ports 344I, 345I. As a result, the liquid within the pressure balance inlet ports 344I, 345I is substantially stagnant.

As is shown in FIGS. 3A and 3B, in this embodiment of the invention, a pressure balance inlet port 344I, 345I is positioned adjacent the exterior side of each end gear 310, 314 within a plane that passes through both the axis of rotation of the end gear 310, 314 and a portion of the inlet port 340I, 343I that is adjacent the interior side of the end gear 310, 314. Thus, as was the case with the inboard gears 111, 112 described above in regard to FIGS. 1A and 1B, because the liquid pressure within each of the various inlet ports and pressure balance inlet ports 340I–345I is normally similar (and preferably equal) to the liquid pressure within all of the other inlet ports and pressure balance inlet ports 340I–345I, the liquid within the inlet ports and pressure balance inlet ports that are adjacent to each end gear 310, 314 exert similar (and preferably substantially equal) and opposite forces on the end gears 310, 314. As a result, the net force exerted on the end gears 310, 314 by the liquid within the various inlet ports and pressure balance inlet ports 340I–345I is relatively small, and preferably substantially equal to zero.

Similarly, in the preferred embodiment of the invention shown in FIGS. 3A and 3B, a pressure balance discharge port 344D, 345D is provided adjacent each end gear 310, 314. Each of these pressure balance discharge ports 344D, 345D is preferably in liquid communication with its corresponding liquid discharge port 340D, 343D (i.e., the liquid discharge port 340D, 343D that is adjacent the end gear 310, 314 with which the pressure balance discharge port 344D, 345D is in liquid communication.) In addition, each pressure balance discharge port 344D, 345D is preferably positioned so it is immediately opposite its corresponding interior liquid discharge port 340D, 343D. In a preferred embodiment of the invention, the pressure balance discharge ports 344D, 345D are configured so that the liquid within the pressure balance discharge ports 344D, 345D is substantially stagnant.

As is shown in FIG. 3A, in this embodiment of the invention, a pressure balance discharge port 345D, 344D is positioned adjacent the exterior side of each end gear 310, 314 within a plane that passes through both the axis of rotation of the end gear 310, 314 and the discharge port 340D, 343D that is adjacent the interior side of the end gear 310, 314. Thus, because the liquid pressure within each discharge port and pressure balance discharge port 340D–345D is similar to (and preferably substantially equal to) the liquid pressure within all of the other discharge ports and pressure balance discharge ports 340D–345D, the liquid within the discharge ports and pressure balance discharge ports that are adjacent to each end gear 310, 314 exerts similar (and preferably substantially equal) and opposite forces on the end gear 310, 314. As a result, the net force exerted on the end gears 310, 314 by the liquid within the various discharge ports and pressure balance discharge ports 340D–345D is relatively small, and preferably substantially equal to zero.

As noted above, both of the pressure balance inlet ports 344I, 345I are in liquid communication with a liquid inlet channel 134 that is also in liquid communication with each of the liquid inlet ports 340I–343I. Also, each pressure balance discharge port 344D, 345D, each of which is positioned adjacent the exterior side of one of the end gears 310, 314, is in liquid communication with its corresponding discharge port (343D and 340D, respectively). For example, referring to FIG. 3A, discharge port 344D is in liquid communication with discharge port 343D, and discharge port 345D is in liquid communication with discharge port 340D.

The structure and assembly of the liquid flow divider 300 of FIGS. 3A and 3B is further depicted in an exploded-view format in FIG. 3C. More particularly, this figure shows the three dimensional relationship between: (1) the first side plate 322; (2) the discharge passageways 350; (3) the central housing 320; (4) the various gears 310–314; (5) the liquid inlet ports 340I–343I; (6) the pressure balance inlet and discharge ports 344I, 344D, 345I, 345D; (7) the second side plate 324; (8) the bearings 332; (9) the inlet passageways 352; (10) the inlet channel plate 325; and (11) the liquid inlet channel 334 defined by the inlet channel plate 325.

Use of Preferred Embodiment

As will be understood by those skilled in the relevant field, the preferred embodiment of the invention described above has many practical applications. For example, the invention may be used in the electrical power generation industry to equally distribute liquid fuel to the various combustors within a gas turbine engine.

Alternative Embodiments of the Invention

The embodiment of the invention shown in FIGS. 3A–3C includes five gears 310–314 and uses these five gears 310–314 to produce four equal discharge flows. However, as shown in FIG. 4, an alternative embodiment of the invention may include three gears 410–412. This alternative embodiment of the invention produces two equal discharges. Similarly, additional embodiments of the invention may include any number of gears greater than one. For example, the invention may include 2, 3, 4, 5, 6, 7, 8, 9, 10, 11, or more gears. In each of these embodiments, the number of discharges will generally be equal to the number of gears within the flow divider minus one. For example, a flow divider according to the present invention that includes 10 gears will typically have 9 equal discharges. Similarly, a flow divider according to the present invention that has 20 gears will generally have 19 equal discharges.

The flexible nature of the linear configuration of gears is depicted in FIG. 2, which graphically demonstrates that various embodiments of the invention may theoretically include any number of gears within a substantially linear configuration.

Although the embodiments of the invention described above include substantially linear series of gears (e.g., a series of gears that is positioned so that the axis of rotation of each gear within the series lies substantially within a common plane), alternative embodiments of the invention may include configurations that include non-linear series of gears. For example, in one alternative embodiment of the invention shown in FIG. 5, the various gears are positioned in a "zig zag", rather than a substantially linear, formation.

In a preferred embodiment of the invention, the first, second, third, and fourth leftmost gears 510–513 are positioned so that this axis of rotation of the leftmost gear 510 and this axis of rotation of the third leftmost gear 512 lie substantially within a first plane, and so that an axis of rotation of the second leftmost gear 511 (which is intermediate the leftmost gear 510 and the third leftmost gear 512) and the axis of rotation of the fourth leftmost gear 512 lie substantially within a second plane, the second plane being substantially parallel to, and offset from, the first plane.

Also, in the embodiment of the invention shown in FIG. 5, the axis of rotation of the leftmost gear 510 and the axis of rotation of the second leftmost gear 511 lie within a third plane, and the axis of rotation of the second leftmost gear 511 and the axis of rotation of the third leftmost gear 512 lie within a fourth plane. In this embodiment of the invention, the first plane and second plane preferably intersect to form an angle that is less than about 178 degrees.

As will be understood by one skilled in the art in light of the above discussion, several alternative gear configurations other than the "zig zag" formation shown in FIG. 5 are possible. For example, the invention may include a series of gears that is configured so that the axis of rotation of each gear within the series lies substantially along a curved line, such as a sinusoidal line. Similarly, the invention may include a series of gears that is configured so that the axis of rotation of each gear within the series lies substantially along a semi-circle.

Also, two or more series of gears (such as the linear series of gears described above) may be stacked together, one behind the other, and linked with coupling shafts so that each gear within each series of gears rotates at the same speed as known in the art. One example of such a configuration 600, in which a first linear series of gears 610 is linked to a second linear series of gears 630 via a linking gear 620 is depicted in FIG. 6.

As should be understood in light of the above disclosure many other configurations are possible. For example, a gear within a linear series of gears may be used to link the series of gears directly to other linear series of gears. One such arrangement, in which the gears are positioned generally in the shape of cross, is depicted in FIG. 7.

As will be understood to one skilled in the art in light of the above disclosure, while the above discussion relates primarily to various embodiments of a fuel flow divider, the above concepts are equally applicable to other devices, and are especially applicable to other fuel metering devices, such as liquid pumps and liquid motors. For example, in one embodiment of the invention, one or more of the gears of the liquid flow divider described above in relation to FIGS. 3A–3C is coupled to an external drive mechanism that is configured to rotate the gears about their respective axes of rotation. In this configuration, the invention acts as an equal-flow pump that pumps liquid from a single inlet stream into a plurality of smaller, equal discharge streams of liquid.

Furthermore, in an alternative embodiment of the invention, the pressure balance discharge port may be provided with liquid from sources other than the corresponding interior liquid discharge port. Preferably, the liquid within each pressure balance discharge port is substantially equal to the pressure within its opposing interior liquid discharge port.

In addition, in an alternative embodiment of the invention, the pressure balance inlet ports may be provided with liquid from sources other than the diametrically opposite inlet port. The liquid within each pressure balance inlet port is substantially equal to the pressure within its corresponding liquid inlet port.

Also, in a further alternative embodiment of the invention, the various gears within the fluid metering device may be of different sizes.

Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What I claim is:

1. A fluid metering device comprising:
    a first gear;
    a second gear disposed adjacent said first gear so that said second gear intermeshes with said first gear;
    a third gear disposed adjacent said second gear so that said second gear is intermediate said first gear and said third gear, and so that said third gear intermeshes with said second gear;
    a fourth gear disposed adjacent said third gear so that said third gear is intermediate said second gear and said fourth gear, and so that said fourth gear intermeshes with said third gear;
    a liquid inlet port that is in liquid communication with both a portion of said second gear and a portion of said third gear;
    a first liquid discharge port that is in liquid communication with both a portion of said first gear and a portion of said second gear;
    a second liquid discharge port that is in liquid communication with both a portion of said third gear and a portion of said fourth gear; and
    a pressure balance port disposed adjacent said first gear, said pressure balance port being in liquid communication with a portion of said first gear, wherein:
        said second gear is configured to move liquid from said liquid inlet port to said first liquid discharge port at a first flow rate,
        said third gear is configured to move liquid from said liquid inlet port to said second liquid discharge port at a second flow rate, and
        said fluid metering device is configured so that:
            (1) liquid passing through said first liquid discharge port exerts a first force on said first gear in a first direction;
            (2) liquid within said pressure balance port exerts a second force on said first gear in a second direction, said second force substantially offsetting at least a portion of said first force; and
            (3) the liquid within said pressure balance port is substantially stagnant.

2. The fluid metering device of claim 1, wherein:
    said second gear comprises a first plurality of gear teeth, said first plurality of gear teeth defining a first cavity;
    said second gear is configured to receive liquid from said liquid inlet port into said first cavity and to move said liquid from said liquid inlet port to said first liquid discharge port by rotating between: (1) a first position in which said first cavity is in liquid communication with said liquid inlet port; and (2) a second position in which said first cavity is in liquid communication with said first liquid discharge port; and said third gear comprises a second plurality of gear teeth, said second plurality of gear teeth defining a second cavity, said third gear being configured to receive liquid from said liquid inlet port into said second cavity and to move said liquid from said liquid inlet port to said second liquid discharge port by rotating between: (1) a first position in which said second cavity is in liquid communication with said liquid inlet port; and (2) a second position in which said second cavity is in liquid communication with said second liquid discharge port.

3. The fluid metering device of claim 1, further including a drive mechanism that is coupled to rotate said first, second, third, and fourth gears about their respective axes of rotation.

4. The fluid metering device of claim 1, wherein said liquid inlet port and said second and third gears are configured so that: (1) liquid from said liquid inlet port exerts a first rotational force on said second gear; and (2) liquid from said liquid inlet port exerts a second rotational force on said third gear.

5. The fluid metering device of claim 1, wherein said liquid inlet port is a first liquid inlet port, and further including:
a fifth gear disposed adjacent said fourth gear so that said fourth gear is intermediate said third gear and said fifth gear, and so that said fifth gear intermeshes with said fourth gear,
a second liquid inlet port that is in liquid communication with both a portion of said fourth gear and said fifth gear; and
a third liquid discharge port that is in liquid communication with both a portion of said fourth gear and said fifth gear.

6. The fluid metering device of claim 5, wherein said fourth gear is configured to move liquid from said second liquid inlet port to said second liquid discharge port.

7. The fluid metering device of claim 1, wherein said first, second, third, and fourth gears are positioned so that the axis of rotation of each of said first, second, third, and fourth gears lies substantially within a single plane.

8. The fluid metering device of claim 7, wherein said liquid inlet port, said first liquid discharge port, and said second liquid discharge port are each adjacent a first side of said single plane.

9. The fluid metering device of claim 8, wherein said liquid inlet port, said first liquid discharge port, and said second liquid discharge port lie substantially along a straight line.

10. The fluid metering device of claim 9, wherein said straight line is substantially parallel to said single plane.

11. The fluid metering device of claim 1, wherein said liquid inlet port, said first liquid discharge port, and said second liquid discharge port lie substantially along a straight line.

12. The fluid metering device of claim 1, wherein:
an axis of rotation of said first gear and an axis of rotation of said second gear lie within a first plane;
an axis of rotation of said second gear and an axis of rotation of said third gear lie within a second plane; and
said first plane and said second plane intersect to form an angle of less than about 178 degrees.

13. The fluid metering device of claim 1, wherein:
said liquid inlet port in a first liquid inlet port;
said fluid metering device further includes a second liquid inlet port that is in liquid communication with both a portion of said first gear and a portion of said second gear; and
said first gear is configured to move liquid from said second liquid inlet port to said first liquid discharge port at a third flow rate.

14. A fluid metering device comprising:
a first gear;
a second gear disposed adjacent said first gear so that said second gear intermeshes with said first gear;
a third gear disposed adjacent said second gear so that said second gear is intermediate said first gear and said third gear, and so that said third gear intermeshes with said second gear;
a fourth gear disposed adjacent said third gear so that said third gear is intermediate said second gear and said fourth gear and so that said fourth gear intermeshes with said third gear;
a liquid inlet port that is in liquid communication with both a portion of said second gear and a portion of said third gear;
a first liquid discharge port that is in liquid communication with both a portion of said first gear and a portion of said second gear,
a second liquid discharge port that is in liquid communication with both a portion of said third gear and a portion of said fourth gear; wherein:
said second gear is configured to move liquid from said liquid inlet port to said first liquid discharge port at a first flow rate; and
said third gear is configured to move liquid from said liquid inlet port to said second liquid discharge port at a second flow rate, wherein
said first, second, third, and fourth gears are positioned so that an axis of rotation of said first gear and an axis of rotation of said third gear lie substantially within a first plane, and so that an axis of rotation of said second gear and an axis of rotation of said fourth gear lie substantially within second plane, said second plane being substantially parallel to, and offset from, said first plane.

15. A fluid metering device comprising:
a first gear;
a second gear disposed adjacent said first gear so that said second gear intermeshes with said first gear;
a third gear disposed adjacent said second gear so that said second gear is intermediate said first gear and said third gear, and so that said third gear intermeshes with said second gear;
a fourth gear disposed adjacent said third gear so that said third gear is intermediate said second gear and said fourth gear, and so that said fourth gear intermeshes with said third gear;
a first liquid inlet port that is in liquid communication with both a portion of said second gear and a portion of said third gear;
a second liquid inlet port that is in liquid communication with both a portion of said first gear and a portion of said second gear;
a first liquid discharge port that is in liquid communication with both a portion of said first gear and a portion of said second gear;

a second liquid discharge port that is in liquid communication with both a portion of said third gear and a portion of said fourth gear; and a pressure balance port disposed adjacent said first gear, said pressure balance port being in liquid communication with a portion of said first gear, wherein;

said second gear is configured to move liquid from said first liquid inlet port to said first liquid discharge port at a first flow rate;

said third gear is configured to move liquid from said first, liquid inlet port to said second liquid discharge port at a second flow rate;

said first gear is configured to move liquid from said second liquid inlet port to said first liquid discharge port at a third flow rate; and said fluid metering device is configured so that:
(1) liquid passing through said second liquid inlet port exerts a first force on said first gear in a first direction;
(2) liquid within said pressure balance port exerts a second force on said first gear in a second direction, said second force substantially offsetting at least a portion of said first force; and
(3) the liquid within said pressure balance port is substantially stagnant.

16. The fluid metering device of claim 15, wherein said first, second, and third flow rates are substantially equal.

17. The fluid metering device of claim 15, wherein said first liquid discharge port and second liquid inlet port are positioned on opposite sides of an intermeshing portion of said first and second gears.

18. The fluid metering device of claim 15, wherein said first and second liquid inlet ports are configured so that a pressure of liquid passing through said first liquid inlet port is substantially equal to a pressure of a liquid passing through said second liquid inlet port.

19. The fluid metering device of claim 18, wherein said first and second liquid inlet ports are configured so that liquid passing through said first liquid inlet port exerts a first force on said second gear in a first direction, and so that liquid passing through said second liquid inlet port exerts a second force on said second gear in a second direction, said second direction being substantially opposite to said first direction.

20. The fluid metering device of claim 19, wherein said first and second forces are of substantially the same magnitude.

21. The fluid metering device of claim 15, further including a third liquid discharge port that is in liquid communication with both a portion of said second gear and a portion of said third gear; and wherein:

said second gear is configured to move liquid from said second liquid inlet port to said third liquid discharge part at a fourth flow rate.

22. The fluid metering device of claim 21, wherein said first and third liquid discharge ports are configured so that liquid passing through said first liquid discharge port exerts a first force on said second gear in a first direction, and so that liquid passing through said third liquid discharge port exerts a second force an said second gear in a second direction that is substantially opposite to said first direction.

23. The fluid metering device of claim 22, wherein said first and second forces are of substantially the same magnitude.

24. The fluid metering device of claim 21, wherein said first, second, third, and fourth flow rates are substantially equal.

25. The fluid metering device of claim 21, further including a third liquid inlet port that is in liquid communication with both a portion of said third gear and a portion of said fourth gear, and wherein:

said third gear is configured to move liquid from said third liquid inlet port to said third liquid discharge port at a fifth flow rate; and said fourth gear is configured to move liquid from said third liquid inlet port to said second liquid discharge port at a sixth flow rate.

26. The fluid metering device of claim 25, wherein said fifth and sixth flow rates are substantially equal.

27. The fluid metering device of claim 25, wherein said first, second, third, fourth, fifth, and sixth flow rates are substantially equal.

28. A fluid metering device comprising:

an inboard gear;

an end gear adjacent said inboard gear:

an interior liquid port disposed adjacent both said inboard gear and said end gear, said interior liquid port being in liquid communication with both a portion of said inboard gear and a portion of said end gear; and a pressure balance port disposed adjacent said end gear, said pressure balance port being: (1) in liquid communication with a portion of said end gear; and (2) positioned so that said pressure balance port is not in liquid communication with said inboard gear and wherein said fluid metering device is configured so that:
(1) liquid passing through said interior liquid port exerts a first force on said end gear in a first direction; and
(2) liquid within said pressure balance port exerts a second force on said end gear in a second direction, said second force substantially offsetting at least a portion of said first force.

29. The gear assembly of claim 28, wherein said second direction is generally opposite said first direction.

30. The gear assembly of claim 28, wherein said interior liquid port and said pressure balance port are positioned on opposite sides of said end gear.

31. A fluid metering device comprising:

an inboard gear;

an end gear adjacent said inboard gear;

an interior liquid port disposed adjacent both said inboard gear and said end gear, said interior liquid port being in liquid communication with both a portion of said inboard gear and a portion of said end gear; and a pressure balance port disposed adjacent said end gear, said pressure balance port being in liquid communication with a portion of said end gear, and wherein said fluid metering device is configured so that:
(1) liquid passing through said interior liquid port exerts a force on said end gear in a first direction;
(2) liquid within said pressure balance port exerts a force on said end gear in a second direction, said second force substantially offsetting at least a portion of said first force; and
(3) liquid within said pressure balance port is substantially stagnant.

32. The gear assembly of claim 31, wherein said second direction is generally opposite said first direction.

33. The gear assembly of claim 31, wherein said interior liquid port and said pressure balance port are positioned on opposite sides of said end gear.

34. A fluid metering device comprising:

an inboard gear having gear teeth;

an end gear having gear teeth, said end gear being disposed adjacent said inboard gear so that said gear teeth of said end gear intermesh with said gear teeth of said inboard gear;

an interior liquid port disposed adjacent both said inboard gear and said end gear, said interior liquid port being in liquid communication with: (1) at least one cavity defined by said end gear's gear teeth; and (2) at least one cavity defined by said inboard gear's gear teeth; and a pressure balance port disposed adjacent said end gear, said pressure balance port being in liquid communication with at least one cavity defined by said end gear's gear teeth, and said pressure balance port being configured so that liquid passing through said pressure balance port exerts forces on said end gear that substantially offset forces exerted on said end gear by liquid passing through said interior liquid port.

35. The fluid metering device of claim 34, wherein said pressure balance port is positioned so that said balance port is not in liquid communication with a cavity defined by said inboard gear's gear teeth.

36. The fluid metering device of claim 34, wherein said interior liquid port and said pressure balance port are disposed on opposite sides of said end gear.

37. The fluid metering device of claim 34, wherein said interior liquid port and said pressure balance port are positioned so that a portion of said interior liquid port, a portion of said pressure balance port, and an axis of rotation of said end gear lie within a common plane.

38. The fluid metering device of claim 34, wherein said inboard gear and said end gear are substantially the same size and shape.

39. The fluid metering device of claim 34, wherein:

said end gear is a first end gear;

said fluid metering device comprises a second end gear; and rotational axes of said first end gear, said inboard gear, and said second end gear each lie substantially within a common plane.

40. A fluid metering device comprising:

an inboard gear having gear teeth;

an end gear having gear teeth, said end gear being disposed adjacent said inboard gear so that said gear teeth of said end gear intermesh with said gear teeth of said inboard gear;

an interior liquid inlet port disposed adjacent both said inboard gear and said end gear, said interior liquid inlet port being in liquid communication with: (1) at least one cavity defined by said end gear's gear teeth; and (2) at least one cavity defined by said inboard gear's gear teeth;

an interior liquid discharge port disposed adjacent both said inboard gear and said end gear, said interior liquid discharge port being in liquid communication with: (1) at least one cavity defined by said end gear's gear teeth; and (2) at least one cavity defined by said inboard gear's gear teeth;

a first pressure balance port disposed adjacent said end gear, said first pressure balance port being in liquid communication with at least one cavity defined by said end gear's gear teeth, and said first pressure balance port being configured so that liquid within said first pressure balance port exerts forces on said end gear that substantially offset forces exerted on said end gear by liquid passing through said interior liquid inlet port; and a second pressure balance port disposed adjacent said end gear, said second pressure balance port being in liquid communication with at least cavity defined by said end gear's gear teeth, and said second pressure balance port being configured so that liquid within said second pressure balance port exerts forces on said end gear that substantially offset forces exerted on said end gear by liquid passing through said interior liquid discharge port.

41. The fluid metering device of claim 40, wherein said end gear is configured to rotate between: (1) a first configuration in which a cavity defined by said end gear's gear teeth is adjacent to, and in liquid communication with, said interior liquid inlet port; and (2) a second configuration in which said cavity is adjacent to, and in liquid communication with, said interior liquid discharge port.

42. The fluid metering device of claim 40, wherein said end gear is configured to move liquid from said first interior inlet port to said interior liquid discharge port.

43. The fluid metering device of claim 40, wherein:

said interior liquid inlet port and said first pressure balance port are disposed on opposite sides of said end gear, and said interior liquid discharge port and said second pressure balance port are disposed on opposite sides of said end gear.

44. The fluid metering device of claim 40, wherein:

said interior liquid inlet port and said first pressure balance port are positioned so that a portion of said interior liquid inlet port, a portion of said first pressure balance port, and an axis of rotation of said end gear lie within a common plane; and said interior liquid discharge port and said second pressure balance port are positioned so that a portion of said interior liquid discharge port, a portion of said second pressure balance port, and said axis of rotation of said end gear lie within a common plane.

45. The fluid metering device of claim 44, wherein said first plane is substantially perpendicular to said second plane.

46. The fluid metering device of 40, wherein:

said first pressure balance port is positioned so that said first pressure balance port is not in liquid communication with a cavity defined by said inboard gear's gear teeth; and said second pressure balance port is positioned so that said second pressure balance port is not in liquid communication with a cavity defined by said inboard gear's gear teeth.

47. A fluid metering device comprising:

an inboard gear having gear teeth;

an end gear having gear teeth, said end gear being disposed adjacent said inboard gear so that said gear teeth of said end gear intermesh with said gear teeth of said inboard gear;

an interior liquid port disposed adjacent both said inboard gear and said end gear, said interior liquid port being in liquid communication with: (1) at least one cavity defined by said end gear's gear teeth; and (2) at least one cavity defined by said inboard gear's gear teeth; and a pressure balance port disposed adjacent said end gear, said pressure balance port being in liquid communication with at least one cavity defined by said end gear's gear teeth, and said pressure balance port being positioned so that said pressure balance port is not in liquid communication with a cavity defined by said inboard gear's gear teeth.

48. A method of dividing a stream of liquid, said method comprising:

provdiing a first gear having gear teeth, said first gear being an end gear;

providing a second gear having gear teeth, said second gear being disposed adjacent said first gear so that said gear teeth of said first gear intermesh with said gear teeth of said second gear, said second gear being an inboard gear;

providing a third gear having gear teeth, said third gear being disposed adjacent said second gear so that (1) said gear teeth of said second gear intermesh with said gear teeth of said third gear, and (2) said second gear is intermediate said first gear and said third gear;

providing a first discharge port that is disposed indjacent both said first gear and said second gear, said first discharge port being in liquid communication with: (1) at least one cavity defined by said first gear's gear teeth and (2) at least one cavity defined by said second gear's gear teeth, wherein a liquid passing through said first discharge port exerts a first force on said first gear in a first direction;

providing a first inlet port that is disposed adjacent both said second gear and said third gear, said first inlet port being in liquid communication with: (1) at least one cavity defined by said third gear's gear teeth; and (2) at least one cavity defined by said second gear's gear teeth;

providing a second discharge port that is disposed adjacent said third gear, said second discharge port being in liquid communication with at least one cavity defined by said third gear's gear teeth, and said second discharge port being positioned so that said second discharge port is not in liquid communication with a cavity defined by said second gear's gear teeth;

providing a pressure balance port disposed adjacent said first gear, said pressure balance port being in liquid communication with a portion of said first gear, wherein a liquid within said pressure balance port exerts a second force on said first gear in a second direction, said second force substantially offsetting at least a portion of said first force;

rotating said second gear about a first axis of rotation so that said second gear moves liquid from said first inlet port to said first discharge port at a first rate; and rotating said third gear about a second axis of rotation so that said third gear moves liquid from said first inlet port to said second discharge port at a second rate, wherein said first flow rate is substantially equal to said second flow rate.

49. The method of claim 48, wherein the liquid within said pressure balance port is substantially stagnant.

* * * * *